United States Patent [19]

Beeman

[11] Patent Number: 5,277,815
[45] Date of Patent: Jan. 11, 1994

[54] IN SITU BIODEGRADATION OF GROUNDWATER CONTAMINANTS

[75] Inventor: Ralph E. Beeman, Stillwater, Okla.

[73] Assignee: E. I. du Pont de Nemours and Company, Wilmington, Del.

[21] Appl. No.: 879,625

[22] Filed: May 4, 1992

[51] Int. Cl.$^5$ .............................................. C02F 3/30
[52] U.S. Cl. ................................. 210/605; 210/610; 210/614; 210/747; 210/901; 210/908
[58] Field of Search ............... 210/603, 605, 610, 611, 210/614, 630, 747, 901, 908; 435/262, 264

[56] References Cited

U.S. PATENT DOCUMENTS

| | | | |
|---|---|---|---|
| 3,846,290 | 11/1974 | Raymond | 210/620 |
| 4,401,569 | 8/1983 | Shiveri et al. | 210/747 |
| 4,588,506 | 5/1986 | Raymond et al. | 210/747 |
| 4,664,805 | 5/1987 | Focht | 210/611 |
| 4,713,343 | 12/1987 | Wilson, Jr. et al. | 210/611 |
| 4,749,491 | 6/1988 | Lawes et al. | 210/610 |
| 4,755,304 | 7/1988 | Hallberg et al. | 210/747 |
| 4,761,376 | 8/1988 | Kulpa | 435/262 |
| 4,925,802 | 3/1990 | Nelson et al. | 210/611 |
| 4,954,258 | 9/1990 | Little | 210/611 |
| 5,006,250 | 4/1991 | Roberts et al. | 210/610 |
| 5,083,611 | 1/1992 | Clark et al. | 166/246 |

FOREIGN PATENT DOCUMENTS 59-19595  2/1984  Japan .

OTHER PUBLICATIONS

Anaerobic Biotransformations of Pollutant Chemicals in Aquifers by Suflita, Gibson, and Seeman, Journal of Microbiology, 3 (1988), pp. 179-194.

Stimulation of Reductive Dechlorination of Tetrachloroethene (PCE) in Anaerobic Aquifer Microcosms by Addition of Short-Chain Organic Acids, Alcohols, Sugars or Aromatic Compounds, Susan A. Gibson, Guy W. Sewell, ManTEch Environmental Technology, Inc. and U.S. Environmental Protection Agency, Robert S. Kerr Environmental Research Laboratory, Ada, OK. 74820.

Biological Reductive Dechlorination of Tetrachloroethylene and Trichloroethylene to Ethylene Under Methanorgenic Conditions by Freedman and Gossett Applied and Environmental Microbiology, Sep. 1989, pp. 2144-2151.

Stimulation of the Reductive Dechlorination of Tetrachloroethene in Anaerobic Aquifer Microcosms by the Addition of Toluene by Sewell and Gibson, Environmental Science & Technology, vol. 25, 1991.

Transformation of Halogenated Aliphatic Compounds by Vogel, Criddle and McCarty, Environmental Science Technology, vol. 21, No. 8, 1987, pp. 722-736.

Tetrachloroethylene as Electron Acceptor for the Anaerobic Degradation of Benzoate, by Scholz-Muramatsu, Szewzyk, Szewzyk, and Gaiser, FEMS Microbiology Letters 66, (1990), pp. 81-86.

Biotransformations of Selected Alkylbenzenes and halogenated Aliphatic Hydrocarbons in Methanogenic Aquifer Material: A Microcosm Study by Wilson, Smith & Rees, Chemical Abstracts, vol. 105, 1986, p. 338.

Primary Examiner—Christopher Upton
Attorney, Agent, or Firm—William D. Hall

[57] ABSTRACT

Regulated processes for biodegrading halogenated organic compounds in an aqueous subsurface environment through stimulation of bacteria are provided. The processes provide an electron donor source to anaerobic dehalogenating bacteria as a stimulus for biodegradation of the contaminants. When necessary to limit the biological formation of vinyl halide monomer, the processes provide for a sulfate reducing environment in the region of biological activity by the addition of an inorganic sulfate. One embodiment provides for converting the aqueous subsurface environment from anaerobic dehalogenating conditions to aerobic conditions. Another embodiment provides for converting the aqueous subsurface environment from anaerobic dehalogenating conditions to anaerobic methanogenic conditions followed by conversion to aerobic conditions in order to completely degrade the contaminants to carbon dioxide and water.

21 Claims, 3 Drawing Sheets

IN SITU BIODEGRADATION OF GROUNDWATER CONTAMINANTS

BACKGROUND AND SUMMARY OF THE INVENTION

SUMMARY OF THE INVENTION

This invention provides an in situ process for the controlled anaerobic degradation, of contaminants in subsurface aquifers. More specifically, the present invention provides a controlled in situ process which utilizes indigenous anaerobic and aerobic bacteria to biodegrade halogenated organic compounds in subsurface aquifers.

BACKGROUND OF THE INVENTION

Halogenated solvents, typically used for dry cleaning and degreasing, are some of the most common and potentially hazardous ground water pollutants. Left untreated in the environment, these pollutants can remain unchanged for periods of fifty years or more. However, through application of the present invention, these pollutants may be biologically degraded to innocuous organic compounds or in one embodiment of the invention, to even carbon dioxide and water in a rapid, economical and environmentally sound manner.

One commonly used technique for decontaminating an aquifer is the "pump and treat" method. As practiced, this method requires a series of extraction and injection wells in the contaminated aquifer. Contaminated water is drawn from the aquifer through an extraction well, treated to remove or degrade the contaminant, then returned to the aquifer through the injection wells. This method is expensive, requires extended time periods for treatment and in some instances creates additional waste.

BACKGROUND ART

Recently attempts have been made to biodegrade these contaminants through bacterial action using aerobic bacteria as disclosed in U.S. Pat. Nos. 4,713,343 and 4,749,491. While aerobic degradation techniques have achieved some limited success in degrading the initial contaminants, such processes can produce end products as toxic or more toxic than the starting compound. Additionally, the application of aerobic processes is limited as such bacteria are unable to degrade certain compounds even after extended periods of exposure.

Through activation and control of anaerobic bacteria, alone or in conjunction with other bacteria, the present invention overcomes the drawbacks of the previous treatment techniques.

GENERAL DISCLOSURE OF THE INVENTION

In general, the present invention provides a regulated process for the anaerobic biodegradation of halogenated organic compounds in subsurface aquifers. The process of the present invention provides an electron donor to indigenous reducing bacteria as a stimulant for biodegradation. In order to limit the production of vinyl halide monomer, a sulfate reducing environment is maintained in the region of biological activity.

The present invention also provides a regulated process for biodegrading halogenated compounds utilizing indigenous anaerobic reducing and anaerobic methanogenic bacteria and other anaerobic, aerobic and facultative bacteria. Process steps include: determining the initial concentration of contaminants and continued monitoring of contaminant concentrations; stimulating biological activity by providing an electron donor source to the bacteria, and limiting the formation of lesser halogenated compounds by maintaining a sulfate reducing environment in the region of biological activity through the addition of sulfate upon the detection of an increased concentration of vinyl halide monomer.

After eliminating the multi-halogenated compounds, the system is converted to an aerobic environment by supplying a source of oxygen to activate the indigenous aerobic bacteria. The aerobic bacteria continue biodegradation of the remaining halogenated compounds to give innocuous organic compounds, water and presumably a halogen salt as the final end products. In one embodiment of the invention, this process includes the addition of bacteria to the contaminated aquifer when the requisite bacteria are missing or insufficient.

The present invention further provides a regulated process for biodegradation of halogenated compounds to give innocuous, environmentally compatible end products such as carbon dioxide, water and presumably a halogen salt. The process utilizes anaerobic dehalogenating bacteria and anaerobic methanogenic bacteria to biodegrade the halogenated compounds to unsubstituted end products. Following reduction of the halogenated compounds to unsubstituted compounds, further degradation to carbon dioxide and water is achieved by supplying a source of oxygen to the subsurface environment to activate aerobic bacteria which may be indigenous or added to the system, if necessary or desired.

Thus, the present invention provides a regulated process for biodegrading halogenated organic compounds in an aqueous subsurface environment through stimulation of bacteria. This process comprises the steps of: (a) determining the initial concentration of halogenated contaminants including vinyl halide monomer in the aqueous subsurface environment; (b) providing an electron donor to dehalogenating bacteria as a stimulus for anaerobic biodegradation of said compounds; (c) establishing a sulfate reducing environment in the region of biological activity by the addition of an inorganic sulfate; (d) limiting the biological formation of vinyl halide monomer by maintaining a sulfate reducing environment in the region of biological activity; (e) monitoring said aqueous subsurface environment for increased concentration of di- and mono-halogenated organic compounds; (f) upon detection of said di-halogenated organic compounds converting said aqueous subsurface environment from anaerobic dehalogenating conditions to anaerobic methanogenic conditions; (g) allowing methanogenic bacteria to further biodegrade said di- and mono-halogenated compounds to produce unsubstituted compounds; (h) converting said biological environment from anaerobic to aerobic by supplying a source of oxygen to activate aerobic bacteria; and, (i) allowing said bacteria to continue aerobic degradation of said halogenated organic compounds to successive organic degradation products and finally to produce carbon dioxide and water.

As underground geology results in a continuous flow of contaminated water into the biodegradation system contamination levels may fluctuate. In order to compensate for the changing contaminant types and levels, the system is capable of cycling between anaerobic and aerobic biodegradation as determined by the contaminants present. Further, the degradation process will continue as the subsurface water flows away from the recirculation wells.

DETAILED DESCRIPTION OF THE INVENTION

The processes of the present invention may be used to decontaminate subsurface aquifers contaminated with halogenated organic compounds. According to one embodiment of the current invention, a process is provided for anaerobically biodegrading halogenated compounds in an aqueous subsurface environment.

The biodegradation process is initiated by the addition of an electron donor source to the aquifer in order to stimulate biological activity. Suitable electron donor sources include any inorganic or organic compound capable of stimulating the reduction of the halogenated contaminants, such as reducing sugars or fertilizers. For example, sodium benzoate has been used successfully to stimulate the biodegradation of tetrachloroethylene. As the list of electron donors is extensive, the invention is not limited to the examples listed herein which are exemplary and not exhaustive of the suitable electron donors. Rather, the choice of an electron donor source may be made based upon the materials obtainable at the treatment site.

In conjunction with the stimulation of the biodegradation process the current invention provides a mechanism for controlling the resultant end products. This limiting feature of the current invention is achieved by maintaining a sulfate reducing environment in the region of biological activity. As sulfate is a better electron acceptor and is preferentially reduced over the di-halo compound, addition of sulfate limits the biodegradation end products to the di-halogenated compounds. The sulfate may be introduced to the system as a salt such as calcium sulfate, potassium sulfate or any other compound which will provide a free sulfate ion in aqueous solution.

The preceding process may be better understood with reference to the accompanying drawings and by way of the following examples. Prior to treating a contaminated aquifer in accordance with the procedure of the current invention, the aquifer must be mapped in order to determine the subsurface geological characteristics and the direction of ground water flow. The mapping may be performed using techniques well known in the art.

Figure 1:
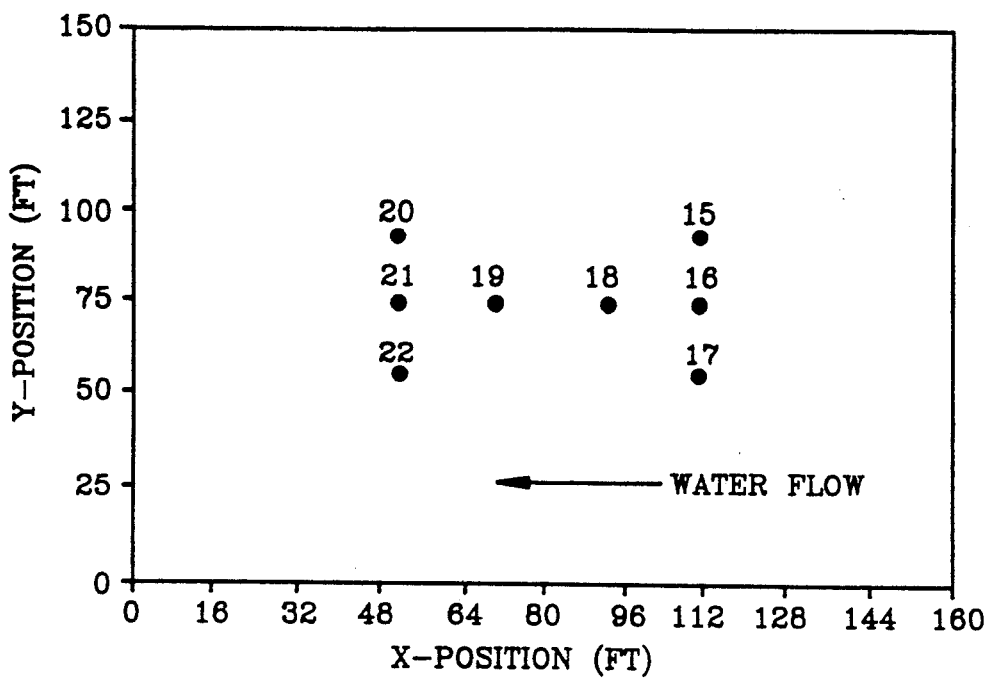
FIG. 1 is a surface plan showing the location of the test wells.

After the subsurface characteristics have been determined, a series of feeder and sampler wells may be drilled in order to allow treatment and testing of the aquifer. FIG. 1 depicts one possible surface arrangement of feeder 15,16,17 and sampler wells 18,19,20,21 and 22. This arrangement was used to generate the data presented in Example 1 below.

As indicated in FIGS. 2-5 the initial concentrations of tetrachloroethylene (PCE), trichloroethylene (TCE), dichloroethylene (DCE), and vinyl chloride (VC) were determined and monitored for each sampler well prior to initiating biodegradation. The concentration of sulfate was also monitored during the biodegradation process and is indicated in FIG. 6 for each sampler well.

Figure 2:
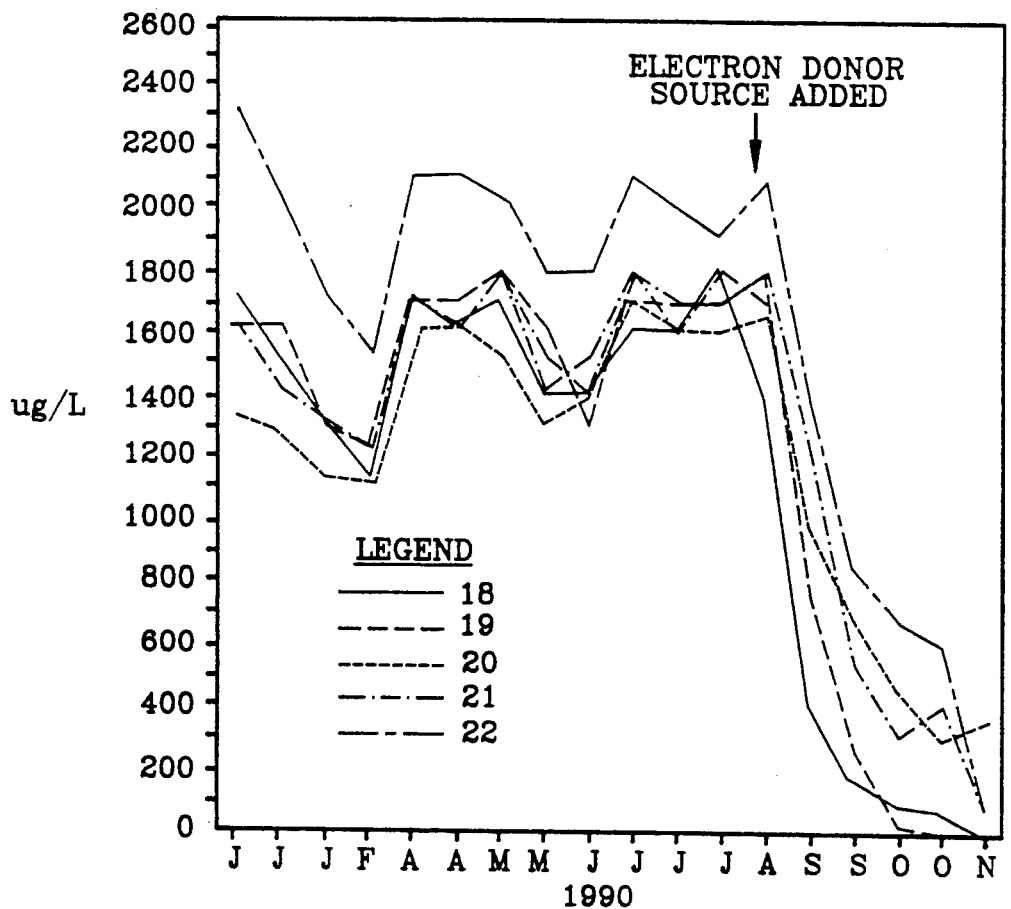
FIGS. 2-6 are graphs charting the concentrations of various compounds within the aquifer.
Figure 3:
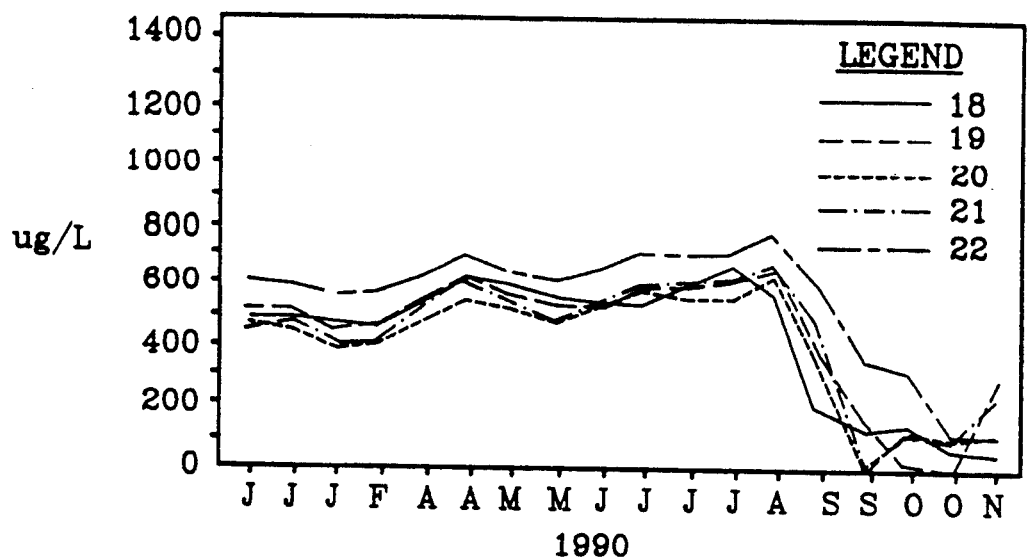
Figure 4:
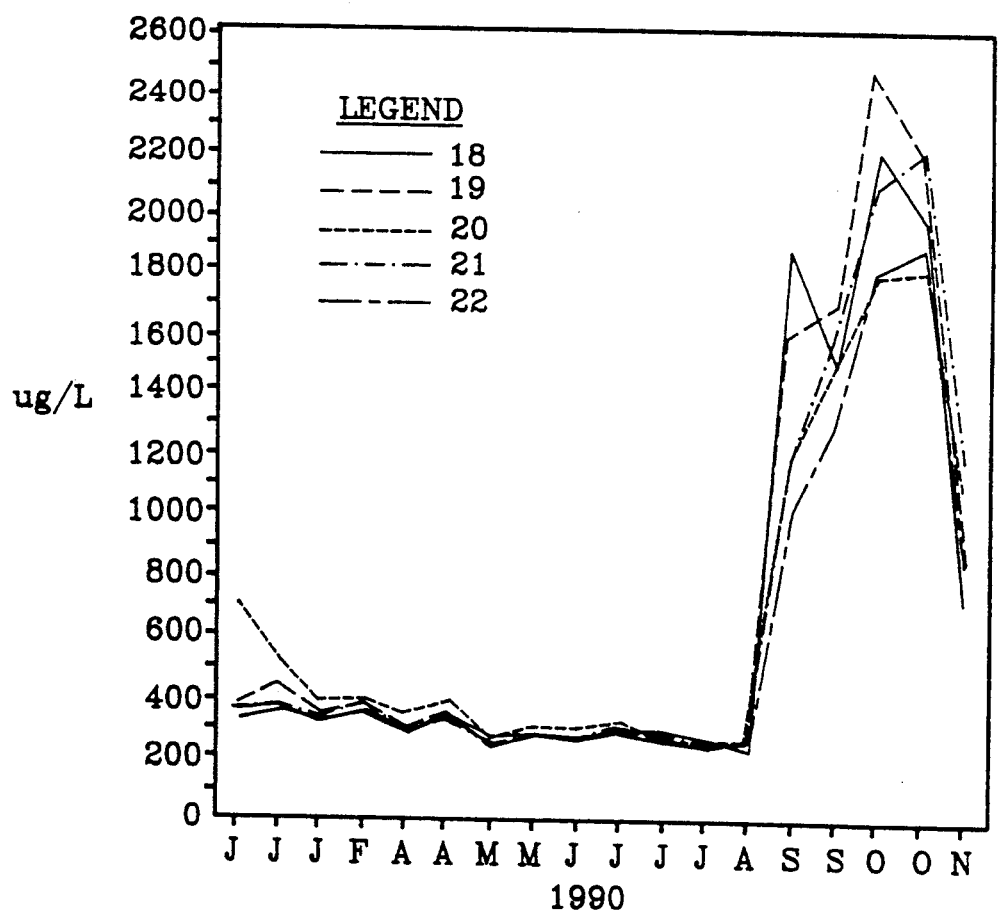
Figure 5:
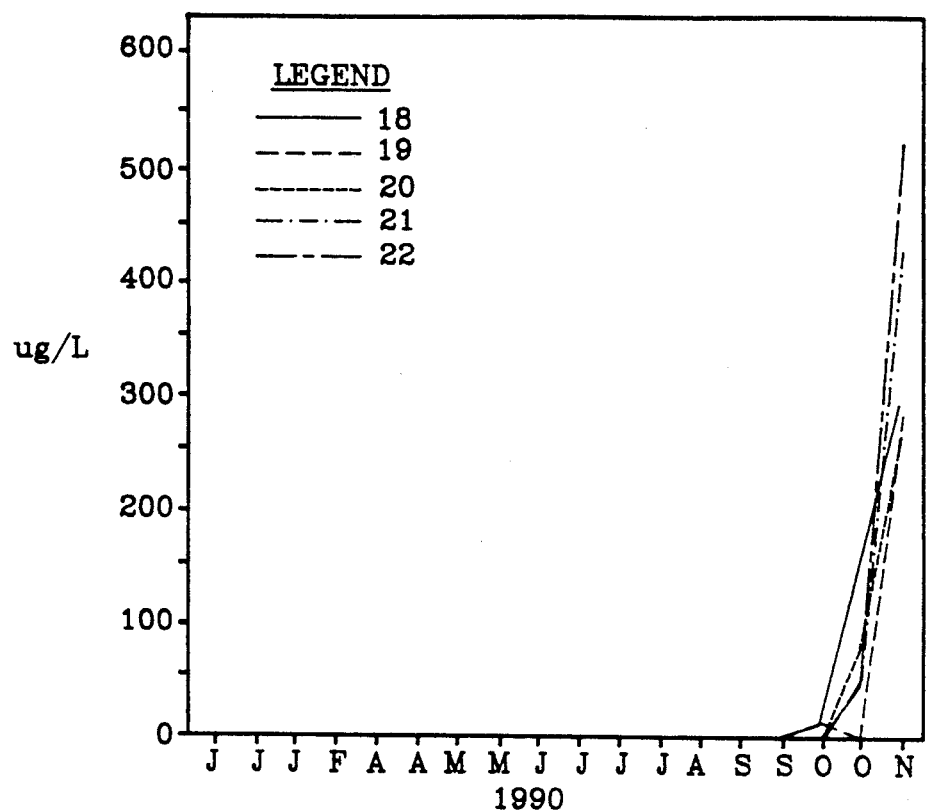
Figure 6:
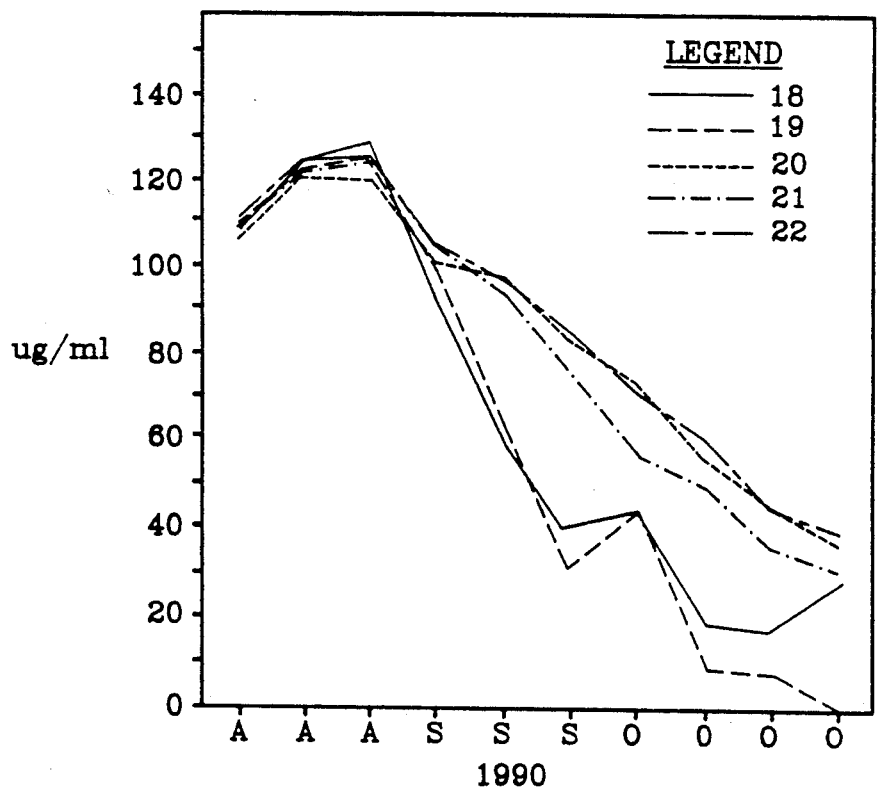

In FIGS. 2-6, the vertical axis represents micrograms ($\mu$g) per liter (l) of measured material for the contaminants and micrograms ($\mu$g) per milliliter for the sulfate. As indicated on the horizontal axis, contaminant concentrations were determined for the period of January, 1990 through mid-November, 1990 and sulfate concentrations were determine monitored from August through October of 1990. FIG. 2 represents the concentration of tetrachlorethylene (PCE). FIG. 3 represents the concentration of trichloroethylene (TCE) . FIG. 4 represents the concentration of dichloroothylone (DCE). FIG. 5 represents the concentration of vinyl chloride (VC) and FIG. 6 represents the concentration of sulfate.

Bacteria known to work within the current processes include dehalogenating bacterium strain DCB-1, Desulfobactariym species and Metthanobacterium species, identified in *Applied Environ. Microbiol.*, Vol 53: 2671-2674, and Methanosarcina species, identified in *Applied Environmental Microbiology*, 54:2976-2980. However, other species are known to function and the invention is not to be limited by the examples provided herein.

As will be further explained in the following example, the present invention provides a process for the regulated anaerobic biodegradation of halogenated organic compounds in an aqueous subsurface environment. The process stimulates biodegradation by providing an electron donor source for the dehalogenating bacteria. Further, the process limits the formation of vinyl halide monomer by maintaining a sulfate reducing environment in the region of biological activity.

The examples contained herein are provided to illustrate the present invention and not to limit it. The applicant does not wish to be limited by the theory presented within the examples; rather, the true scope of the invention should be determine based on the attached claims. All parts and percentages within the examples are by weight unless otherwise specified.

EXAMPLE 1

An aquifer known to be contaminated with chlorinated solvents was geologically mapped. After determination of the subsurface characteristics and the direction of flow of the ground water, a series of feeder wells (15,16,17) and sampler wells (18,19,20,21,22) were drilled as depicted in FIG. 1. Following the drilling of the wells, the initial concentration of the subsurface contaminants was determined by GCIMS analysis according to standard EPA methods 8240 and ethylene 8015. As shown by FIG. 2, the concentration of PCE prior to the initiation of biodegradation ranged from about 1100 ug/L to about 2300 ug/L. FIG. 3 shows the initial concentration of TCE to range from about 450 to about 600 ug/L. FIG. 4 shows the initial concentration of DCE to range from about 340 ug/L to about 720 ug/L and FIG. 5 indicates VC to be virtually undetectable.

After determining the levels of contaminants, biodegradation was initiated and maintained by the addition of sodium benzoate as an electron source, through the feeder wells. Sodium benzoate was chosen in this instance due to its ready availability. During addition of the sodium benzoate, the aquifer was constantly monitored by spectrophotometric methods in order to insure a sulfate reducing condition in the region of biological activity and when necessary, additional sulfate was added in the form of calcium sulfate.

PCE degraded rapidly after stimulation of the biodegradation process. FIG. 2 indicates that three sampler wells showed nearly undetectable levels of PCE within less than two months of the stimulation of the process and the remaining wells showed less than 400 ug/L. Likewise FIG. 3 shows a corresponding decrease in TCE upon initiation of biodegradation with final concentrations ranging from about 56 to about 280 ug/L. As further evidence of biological activity, FIG. 4 indicates the expected increase in DCE concentration due to the maintenance of sulfate reducing conditions in the aquifer.

While the applicant does not wish to be limited by the theory presented herein, the applicant believes that the dehalogenating bacteria reduce the PCE and TCE leading to the resulting end product of DCE. It is also believed that absent sulfate reducing conditions the DCE would be further reduced to VC; however, as dehalogenating bacteria will preferentially utilize sulfate as an electron acceptor, substantially all sulfate present in the aquifer must be reduced to sulfide before any DCE will be reduced to VC. The ability of sulfate to limit if not wholly preclude the formation of VC is demonstrated in FIGS. 4, 5 and 6.

As noted above, the maintenance of a sulfate reducing condition in the aquifer resulted in an increase in the concentration of DCE, as illustrated in FIG. 4. During the period of increasing concentration of DCE, the concentration of VC remained at undetectable levels, as shown in FIG. 5, and the concentration of sulfate remained relatively high as shown in FIG. 6. However, as the concentration of sulfate dropped as indicated in FIG. 6, a corresponding decrease in concentration of DCE is detected as the bacteria began to utilize the DCE as an electron acceptor; thereby, reducing the DCE to VC. The reduction of DCE leads to the corresponding increase in VC concentration shown in FIG. 5, with VC levels reaching as high as 500 ug/L.

In certain aquifers it may be desirable to halt the biodegradation process upon the elimination of a majority of PCE and TCE, as in the above example. However, at this point the system may be converted to aerobic degradation by supplying a source of oxygen to the aquifer, thereby stimulating the degradation of DCE by aerobic bacteria. The resulting end products of this biodegradation process would be innocuous organic compounds and water.

FURTHER EMBODIMENTS

In one further embodiment, the present invention utilizes indigenous anaerobic and aerobic bacteria. According to this embodiment, the initial concentration of the contaminants is first determined and is monitored during the degradation process. A suitable electron donor source is provided to the indigenous anaerobic bacteria as a stimulus for biological activity. Additionally, a sulfate reducing environment is maintained through the addition of a sulfate salt in order to preclude the formation of vinyl halide. Additional sulfate may be added during the degradation process if vinyl halide is detected.

Once testing determines that the majority of tetra- and tri- halide compounds have been degraded to the di-chloro compound, the biological environment is converted from anaerobic to aerobic by supplying an oxygen source. Following this conversion, the aerobic bacteria biodegrades the halogenated organic compounds to produce innocuous organic compounds and water.

In another embodiment, the process of the present invention utilizes indigenous anaerobic dehalogenating bacteria, anaerobic methanogenic bacteria and other indigenous bacteria to completely degrade the halogenated contaminants to carbon dioxide and water. According to this process, the initial concentration of contaminants including vinyl halide monomer is first determined followed by addition of an electron donor source to the indigenous anaerobic dehalogenating bacteria as a stimulus for biodegradation. Additionally, a sulfate reducing environment is maintained in order to limit the production of vinyl halide monomer.

As biodegradation progresses, the system is monitored in order to detect increased concentrations of di-halo compounds and vinyl halide. Upon detection of an increased concentration of di-halo compounds, the system is converted from anaerobic dehalogenating conditions to anaerobic methanogenic conditions. This change is brought about by ceasing the addition of sulfate and permitting aquifer sulfate levels to drop as the reaction continues.

Upon achieving methanogenic conditions, the indigenous methanogenic anaerobic bacteria begin biodegrading the di-halo compounds. The methanogens or other bacteria are allowed to continue the degradation process until the halogenated compounds are converted to unsubstituted compounds. The process upon reaching this state may be halted or allowed to continue aerobically.

Once the conversion to unsubstituted compounds is complete, the system may be converted from anaerobic to aerobic by the addition of oxygen. After oxygen is added to the system, indigenous aerobic bacteria become active and continue the degradation process. The aerobic bacteria continually breakdown the organic compounds until the end products of carbon dioxide and water are produced.

EXAMPLE 2

An aquifer known to be contaminated with chlorinated solvents is geologically mapped. After determining the subsurface characteristics and the direction of ground water flow, a series of feeder and sampler wells are drilled. Following the drilling of the wells, the initial concentration of the subsurface contaminants is determined.

After determining the levels of contaminants, biodegradation is initiated and maintained by the addition of a suitable electron donor source, through the feeder wells. During the biodegradation process, the aquifer is constantly monitored in order to insure a sulfate reducing condition in the region of biological activity and when necessary, additional sulfate is added. After stimulation of the biodegradation process, PCE and TCE rapidly degrade, producing an increased concentration of DCE due to the maintenance of a sulfate reducing environment.

As noted above, the maintenance of a sulfate reducing condition in the aquifer will increase the DCE concentration. During the period of increasing concentration of DCE, the concentration of VC is preferably not allowed to increase and the concentration of sulfate should be maintained at a level to preclude biodegradation of the DCE.

Upon detecting the increased levels of DCE due to the degradation of the PCE and TCE, the system is converted to anaerobic methanogenic conditions by allowing the sulfate concentration to drop. After the sulfate has been eliminated, the methanogenic bacteria utilize the DCE and VC as electron acceptors, thereby reducing both compounds to unsubstituted compounds.

After the methanogenic bacteria have reduced the halogenated compounds to unsubstituted compounds, the system can be halted, continued or is converted to aerobic degradation by supplying an oxygen source to the aquifer. Upon addition of the oxygen source other indigenous bacteria begin to biodegrade the reduced compounds to successive organic degradation products finally producing carbon dioxide and water.

In addition to the above embodiments discussed in Examples 1 and 2, it is contemplated that certain aquifers may lack the requisite bacteria to carry out this process. In those instances,, the requisite bacteria may be added to the system as the initial aquifer treatment step of the process. Further, other embodiments will be apparent to those skilled in the art from a consideration of this specification or practice of the invention disclosed herein. It is intended that the specification and example be considered as only exemplary, with the true scope and spirit of the invention being indicated by the following claims.

I claim:

1. A regulated process for biodegrading halogenated organic compounds in an aqueous subsurface environment through stimulation of bacteria, comprising:
   (a) determining the initial concentration of said halogenated compounds and monitoring the concentration of said halogenated compounds during biodegradation; and
   (b) providing an electron donor to dehalogenating bacteria as a stimulus for anaerobic biodegradation of said compounds; and
   (c) limiting the biological formation of lesser halogenated compounds by maintaining a sulfate reducing environment in the region of biological activity and adding additional sulfate upon detection of an increase in concentration of lesser halogenated compounds; and
   (d) determining the elimination of a majority of higher halogenated compounds and converting said biological environment from anaerobic to aerobic by supplying a source of oxygen to activate aerobic bacteria; and (e) allowing said aerobic bacteria to continue aerobic biodegradation of said halogenated organic compounds to produce innocuous organic compounds and water.

2. In subsurface aquifers lacking the appropriate indigenous bacteria the process of claim 1 wherein the initial aquifer treatment step is the addition of bacteria.

3. The process of claim 1 wherein said electron donor source is an inorganic compound capable of supplying an electron.

4. The process of claim 3 wherein said inorganic compound is sodium benzoate.

5. The process of claim 1 wherein said electron donor source is selected from the class of organic compounds capable of supplying an electron.

6. The process of claim 1 wherein said sulfate reducing environment is maintained by adding excess inorganic sulfate.

7. The process of claim 6 wherein said inorganic sulfate is calcium sulfate.

8. The process of claim 1 wherein said oxygen source is provided by sparging air into the aqueous subsurface environment.

9. The process of claim 1 wherein said oxygen source is provided by sparging oxygen into the aqueous subsurface environment.

10. The process of claim 1 wherein said oxygen source is provided by the addition of hydrogen peroxide.

11. The process of claim 1 wherein said process is cycled between anaerobic and aerobic degradation as determined by the contaminants in the system.

12. A regulated process for biodegrading halogenated organic compounds in an aqueous subsurface environment through stimulation of bacteria, comprising:
   (a) determining the initial concentrations of said halogenated compounds including the concentration of vinyl halide and all higher halogenated compounds and monitoring the concentration of said halogenated compounds during biodegradation; and
   (b) providing an electron donor to dehalogenating bacteria as a stimulus for anaerobic biodegradation of said compounds;
   (c) establishing a sulfate reducing environment in the region of biological activity by the addition of an inorganic sulfate; and
   (d) limiting the biological formation of vinyl halide monomer by maintaining a sulfate reducing environment in the region of biological activity; and
   (e) monitoring said aqueous subsurface environment for increased concentration of di- and mono-halogenated organic compounds;
   (f) upon detection of said di-halogenated organic compounds converting said aqueous subsurface environment from anaerobic sulfate reducing conditions to anaerobic methanogenic conditions;
   (g) allowing methanogenic bacteria to further biodegrade said di- and mono-halogenated compounds to produce unsubstituted compounds;

13. The process of claim 12 including the additional steps of
   (a) converting said biological environment from anaerobic to aerobic by supplying a source of oxygen to activate aerobic bacteria; and
   (b) allowing said bacteria to- continue aerobic degradation of said halogenated organic compounds to successive organic degradation products and finally to produce carbon dioxide and water; and
   (c) cycling the system between anaerobic and aerobic degradation as determined by the contaminants in the system.

14. The process of claim 13 wherein said oxygen source is provided by sparging air into the aqueous subsurface environment.

15. The process of claim 13 wherein said oxygen source is provided by sparging pure oxygen into the aqueous subsurface environment.

16. The process of claim 13 wherein said oxygen source is provided by the addition of hydrogen peroxide.

17. In subsurface aquifers lacking the appropriate indigenous bacteria the process of claim 12 wherein the initial aquifer treatment step is the addition of bacteria.

18. The process of claim 12 wherein said electron donor source is an inorganic compound capable of supplying an electron.

19. The process of claim 18 wherein said inorganic compound is sodium benzoate.

20. The process of claim 12 wherein said electron donor source is selected from the class of organic compounds capable of supplying an electron.

21. The process of claim 12 wherein said inorganic sulfate is calcium sulfate.

* * * * *